3,440,263
METHOD OF PREPARING MODIFIED SILICONE POLYMERS
James A. Brennan, Cherry Hill, N.J., assignor to Mobil Oil Corporation, a corporation of New York
No Drawing. Filed Dec. 23, 1964, Ser. No. 420,806
Int. Cl. C07f 7/08, 7/02
U.S. Cl. 260—448.2                    13 Claims

ABSTRACT OF THE DISCLOSURE

The reaction between a silicone polymer containing Si-H bonds and olefinic compounds can be carried out to completion by first percolating the olefin over an activated adsorbent material, maintaining the olefin in a nonoxidizing atmosphere and then reacting the olefin with the silicone polymer, using an excess of olefin. The pretreatment permits complete removal of the said Si-H bonds and prevents gellation of the alkylated silicone.

---

This invention relates to an improved method of preparing certain modified silicone polymers and particularly to the preparation of alkylated silicones for use as lubricating oils and hydraulic fluids.

Commercial silicone polymers have excellent chemical stability and flow properties making them desirable for use as hydraulic fluids. These silicones are considered to have better thermal stability and wide temperature range viscosity characteristics than those of many hydraulic fluids. However, commercial silicones are not only relatively expensive, they also tend to be incompatible with hydrocarbon lubricants. Attempts to reduce their high cost by diluting them in less expensive lubricants have been, until recently, unsuccessful. In another respect, the silicones are known to provide poor lubrication for certain metal operations, such as steel sliding over steel.

It has recently been discovered to modify silicone polymers containing silicon-hydrogen bonds with an olefinic compound in the presence of a catalyst. This discovery has been described and claimed in a copending United States patent application Ser. No. 308,335, filed Sept. 12, 1963. The modified products disclosed in this application are hydraulic fluids having the viscosity characteristics of the silicones, yet possessing miscibility with hydrocarbon lubricants. However, it has recently been found that these products, upon storage over an extended period of time or when subjected to prolonged heat, tend to form a "gel" or a gum rubber. Moreover, the reaction between the olefin and the silicone may be incomplete and it is believed that residual silicon-hydrogen bonds in the product initiate the formation of these gels.

It is, therefore, an object of this invention to provide a process for preparing highly alkylated silicone polymers which contain substantially no silicon-hydrogen bonds. It is another object of this invention to provide a method of producing highly alkylated silicone polymers which will not form solids upon storage or heating.

These and other objects I achieve by producing silicone polymers having a high hydrocarbon content by the steps (1) percolating an olefinic compound over an adsorbent substance and maintaining the said percolated olefin in a nonoxidizing atmosphere and (2) reacting at least a stoichiometric amount of said percolated olefin with a silicone polymer containing hydrogen atoms directly bonded to the silicon atoms, in the presence of a suitable alkylation catalyst. My preferred catalyst is one containing a metal of the platinum group, specifically, platinum, palladium, ruthenium and osmium.

I have discovered that by the pretreatment of the olefinic compound prior to the alkylation step not only will the reaction proceed to completion, as evidenced by the complete removal of the silicon-hydrogen bonds, but also the reaction is performed in a considerably shorter time. It is believed that the olefin may contain impurities which will interfere with the alkylation. Although the exact nature of the impurities is not known with certainty, I find that the silicone products obtained by reacting with my pretreated olefins have a higher hydrocarbon content, greater thermal stability and more acceptable lubricating properties over a wide temperature range than hitherto obtained.

The silicone polymer to be reacted with the olefinic compound according to the present invention contains hydrogen atoms bonded directly to the silicon atoms in the polymer chain. Approximately between 18% and 25% of the silicon bonding in commercial polymers are silicon-hydrogen bonds. These polymers may be characterized as containing the recurring structure:

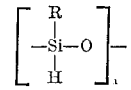

wherein R may be a hydrogen atom, or hydrocarbyl radical, such as an alkyl, cycloalkyl, aryl, alkaryl, or aralkyl group containing preferably from 1 to 30 carbon atoms, or a siloxane side chain similar to the main polymer chain, and $n$ is the number of recurring units in the range of 4 to 40. When R is a hydrocarbyl group, the ratio of R groups to the silicon-bonded hydrogen atoms (or R/H) in the polymer is from about 1 to about 2.

These polymers may be linear or cyclic. Typical linear structures may have the formulation,

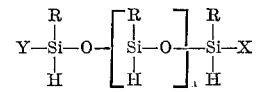

wherein R and $n$ have the aforementioned meanings, and the groups X and Y, which may be the same or different, may be hydrogen atoms, hydrocarbyl groups or alkoxyl groups. An acceptable molecular weight for these silicone polymers is in the range of about 400 to about 10,000 and preferably between about 500 to 2800.

The mechanism for the reaction between the silicone polymer and the olefin is believed to take the following form:

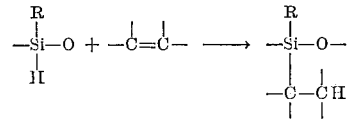

When R is hydrogen, however, a similar addition type of reaction may also occur between that hydrogen atom and the olefin.

Olefinic compounds used in the alkylation of silicone polymers according to this invention may be selected from compounds containing at least one ethylenic bond. This includes preferably the mono-olefinic hydrocarbons, having from about 5 to 16 carbon atoms and most preferably 6 to 10 carbon atoms, such as the alpha-olefins, hexene-1, heptene-1, octene-1, decene-1, and hexadecene, and cyclohexene and cycloheptene. These olefinic systems may also includ polyolefins such as, butadiene; polymeric materials containing ethylenic unsaturation, such as polybutene; aromatic compounds, such as styrene; and oxygen and nitrogen compounds, namely, esters of either unsaturated acids or alcohols, such as dioctyl maleate, dioctyl fumarate, methyl-10-undecenate, acid compounds, such as tetrapropenylsuccinic anhydride, and amines, such as dibutylamine methacrylate.

In general, these olefinic compounds contain from about 4 to about 16 carbon atoms. The olefinic reactant, moreover, may be a single compound or mixture of olefins in the alkylation of the silicone polymer.

I prefer to use at least a 10% stoichiometric excess of the olefinic compound over the silicone polymer. Although use of this excess of olefin does not ensure complete reaction by itself, it is clear that if the amount of the olefinic compound is below the stoichiometric balance, the product retains silicon-hydrogen bonds. Suitable molar ratios range from about 1.10 to about 3.75 moles of olefin per equivalent of the silicone (based on the recurring hydrogen silicone structure).

The catalyst preferably used in the synthesis of these alkylated silicone polymers include the platinum group metals, i.e., platinum, palladium, ruthenium and osmium, either in the form of deposited metal, such as platinum supported on finely-divided charcoal and containing from about 0.1% to about 3.0% by weight of platinum, or in the form of a platinic derivative, such as chloroplatinic acid. The catalyst may be present in the reaction in amounts ranging from about 0.3% to about 5.0% based on the weight of the total reactants, and preferably from about 0.4% to about 1.0% by weight.

In the preferred manner of carrying out this invention, the olefinic compound is passed through a column of the adsorbent, preferably activated alumina, at room temperature and collected under a nonoxidizing atmosphere. A very suitable substance, for example, is nitrogen. However, the reaction with the silicone polymer may be conducted under reflux conditions and hence the olefin vapor at reflux also provides a sufficient nonoxidizing atmosphere. If high molecular weight olefins are used, certain organic solvents may be added to the reaction mixture; in such cases, the solvent vapor is another protective medium for the treated olefins. For these reasons, the olefin is preferably reacted with the silicone as soon after the percolation as possible.

The treated olefin is added to the reaction vessel with the catalyst and, if desired, the high boiling hydrocarbon solvents inert to the reacting materials, such as xylene, n-heptane and the like. I have found that the low molecular weight olefins themselves being present in excess amounts may be most preferably used as a solvent for the reaction mass. As explained previously, higher olefins may require the presence of inert solvents. The olefin and catalyst mixture is heated to the reaction temperature and the silicone polymer is added slowly thereto at a rate which will maintain the desired temperature.

When all of the silicone polymer has been introduced, the reaction mass is maintained at the desired temperature for a period of time ranging from about 30 minutes to about 10 hours. Usually the reaction will be complete, i.e., no residual silicon-hydrogen bonds, after from 30 minutes to 4 hours. I have found that if no treatment of the olefinic compound is made, silicon-hydrogen bonds may remain in the reaction product no matter how long the reaction mass is allowed to be heated or else extremely larger amounts of catalyst must be present in the reaction mass.

The products made according to the method of this invention have excellent thermal stability and the kinematic viscosities at temperatures ranging from as low as −65° F. to as high as 400° F. show that they are valuable for use in a wide variety of fluid systems. Moreover, the products prepared according to the method of this invention may be used to prepare a variety of valuable products ranging from lubricating oils to greases, all possessing excellent physical and chemical properties.

The reaction tempertaure is preferably the reflux temperature of the inert solvent or of the olefin, when that is used as the solvent. More specifically, the reaction may be carried out at temperatures in the range of about 20° C. to about 280° C., and preferably from about 60° C. to about 180° C.

These alkyl-modified silicone polymers prepared according to the process of this invention may be combined with oils or other lubricating compositions containing other additives depending upon the use of the said lubricant.

The following specific examples are given to illustrate the present invention without intending to limit the scope thereof.

EXAMPLE I

Through a glass column, 50 mm. in diameter and 123 cm. in length, containing 90 cm. of activated alumina, were passed about 5 gallons of decene-1, at the rate of about 200 ml. per hour, under a blanket of nitrogen gas, at room temperature.

A mixture of 100 grams (0.716 mole) of the above treated decene-1, 23.0 grams of a methyl hydrogen silicone polymer having a molecular weight of about 480, and 0.43% by weight of reaction mixture of 1% platinum deposited on charcoal (said charcoal having a particle size of 8 to 14 mesh) were added to a four-necked reaction flask, equipped with a thermometer, stirrer and condenser. The silicone polymer was the light distillate fractions of a silicone polymer having a molecular weight of 1690; the light fractions were obtained by distilling the polymer up to 122° C. and 0.5 mm. Hg.

The reaction mixture was heated to reflux conditions and held for 131 minutes. At the end of that time the catalyst was filtered off and excess decene-1 was removed by vacuum distillation at 80° C. and 60 mm. Hg.

The liquid contained no residual silicon-hydrogen bonds. It had a pour point of −25° F. and a cloud point of −26° F.; the molecular weight was about 1065.

EXAMPLE II

Hexene-1 was treated in the same manner as decene-1 was treated in Example I. Into the reactor were mixed 85.0 grams (1.01 mole) of pretreated hexene-1 and 23.0 grams of the silicone polymer fraction and 0.43% by weight of the same catalyst used in Example I. This reaction mixture was heated under reflux conditions for 237 minutes. At the end of that time the catalyst was filtered off and the excess hexene-1 removed by distillation.

The modified polymer in the form of a liquid product contained no residual silicon-hydrogen bonds. The pour point was less than −65° F. and the cloud point was less than −65° F. The molecular weight was about 960.

EXAMPLE III

A product similar to that of Example II was prepared by a slightly different procedure from 600 grams (7.15 mole) of the hexene-1, 200 grams of a methyl hydrogen silicone polymer having a molecular weight of 450 and 0.50% by weight of the catalyst. The hexene-1 and the catalyst were premixed and heated to reflux, whereupon the silicone polymer was added, drop-wise, over a period of 70 minutes. The reaction mixture was then maintained at reflux conditions for an additional 30 minutes.

The product had substantially the same properties as those of the product of Example II.

EXAMPLE IV

Using the same procedure as in Example III, 114.0 grams (1.02 mole) of pretreated octene-1, 23 grams of the silicone polymer fraction and 0.43% by weight of the same catalyst of Example I. The hexene-1 and the catalyst were mixed and heated to reflux. The silicone polymer was then added, drop-wise, over a period of 17 minutes. When all of the polymer had been mixed in, the reaction mixture was maintained at reflux for an additional 86 minutes.

The resulting product contained no residual silicon-hydrogen bonds. It had a pour point of less than −65° F.

and a cloud point of less than −65° F. The molecular weight of the product was about 1120.

EXAMPLE V

Into a 50 gallon reactor were added 74 lbs. of hexene-1 pretreated with activated alumina, and 20.5 ml. of a solution of 2.5 grams of $H_2P+Cl_6 \cdot 6H_2O$ dissolved in 50 ml. of isopropanol. This mixture was heated to reflux. A methylhydrogen silicone polymer having a molecular weight of 840 was added to the reactor until a total of 20 lbs. had been added. The time of addition took 135 minutes. The reaction mixture was maintained at reflux conditions for 284 minutes thereafter.

The mixture was cooled and the catalyst removed by washing with water. The excess hexene-1 was removed by distillation.

The liquid product contained no residual silicon-hydrogen bonds and had a pour point of less than −65° F. and a cloud point of less than −65° F.

EXAMPLE VI

The methyl hexyl silicone, prepared according to the procedure of Example III was compared with a commercial dimethyl silicone polymer, a hydrogenated polydecene, having a molecular weight between 500 and 525, and a pentaerythritol mixed ester lubricant (prepared from valeric and pelargonic acids) for lubricating steel sliding against steel. Also tested were a 50% by weight blend of the methyl hexyl silicone and the polydecene and a combination of this blend with a chlorinated wax, sufficient to provide a 0.5% chlorine content.

An accepted test for evaluating this characteristic is known as the Shell Four-Ball Test. The test procedure is as follows: three one-half inch 52–100 steel balls are clamped in a stationary ball cup. The lubricant to be tested is added to cover the balls. The fourth ball is held in a chuck at the lower end of a vertical spindle and is rotated against the three stationary balls. A series of short period runs are made with increasing loads (increments of 10 kg.) until welding of the balls occurs. The diameter of the weld scar is an indication of the load-carrying ability of the fluid. The test is conducted at 200° F. for two hours, and results reported in Table I at 20 and 40 kg. loads and at 1200 and 600 r.p.m., respectively.

TABLE I

| Fluid | Diameter of scar, mm. | |
|---|---|---|
|  | 20 kg. at 1,200 r.p.m. | 40 kg. at 600 r.p.m. |
| (1) Commercial dimethyl silicone | 1.400 |  |
| (2) Hydrogenated polydecene | 0.887 | 0.955 |
| (3) Ester oil | 0.837 |  |
| (4) Example III | 0.76 | 2.200 |
| (5) 50% fluid 4 and 50% fluid 2 |  | 0.680 |
| (6) Chlorinated wax and fluid 5 to provide 0.5% chlorine |  | 0.590 |

It will be noted that the heavier the load the greater is the scarring of the weld. The commercial dimethyl silicone fluid gave a scar diameter of 1.400 mm. under moderate loading at 20 kg. and 1200 r.p.m.; the polydecene and the ester gave scar diameters of 0.887 and 0.837 mm., respectively; the methyl hexyl silicone gave the least scar diameter of only 0.76 mm. At 40 kg. and 600 r.p.m., the 50% blend of the methyl hexyl silicone and polydecene had a scar diameter of only 0.680 mm. Surprisingly, the silicone and hydrocarbon blend provided better lubrication in this instance than either of the two separately, while the chlorinated wax blend gave the lowest scar diameter of 0.590 mm. Thus the solubility of the alkylated silicones to be blended with less costly hydrocarbons, by using the procedure of this invention, enables the formulating of effective load-carrying lubricants which could not be obtained by other silicone fluids.

EXAMPLE VII

Using the procedure of Example III, 370 grams of pretreated hexene-1 was combined with 0.30% by weight of total reactants of the 1% platinum-on-charcoal catalyst in a reaction flask. The mixture was heated to reflux and 100 grams of a "bottoms residue" of the methyl hydrogen silicone, subjected to distillation as described in Example I, were added slowly over a 50 minute period. The reaction mass was maintained at reflux. At the end of this time the catalyst was filtered off and the excess hexene was removed by vacuum distillation.

The resulting liquid product contained no residual silicon-hydrogen bonds.

EXAMPLE VIII (A) Using the procedure of alkylation of Example I, 85 grams of a roughly 50–50 by weight mixture of hexene-1 and heptene-1, which had not been pretreated by percolation through activated alumina, were combined with 23.0 grams of the residue of the methyl hydrogen silicon distillation performed as in Example I and 0.43% by weight of 1% platinum-on-charcoal catalyst. The reaction mixture was heated to reflux and maintained for 120 minutes. At the end of this time the catalyst was removed and the excess olefin withdrawn by vacuum distillation. The remaining product was a very viscous material having a viscosity of 1600 cs. at 100° F. When a sample of this product was heated in a 210° F. viscosity water bath, the oil turned into a gum-like solid.

Using the same procedure and the same quantities of reactants except that the olefin was untreated hexene-1, the product obtained therefrom was stored for several days at ambient temperatures and upon re-examination was found to be a solid.

In both cases the product had been found to contain silicon-hydrogen bonds by spectroscopy.

(B) In this example, following the same procedures as in (A), the mixture of hexene-1 and heptene-1 was pretreated according to the method of this invention. The product obtained was found to have no silicon-hydrogen bonds, and remained in a liquid state when heated in a 210° F. bath.

EXAMPLE IX

Following the method of Example III, 120.0 grams (0.535 mole) of pretreated hexadecene-1, 100 ml. of n-heptane and 0.40% by weight of the 1% platinum-on-charcoal catalyst were heated to reflux. To the refluxing mixture were added 25 grams of the distillation residue of the methyl hydrogen silicone of Example I drop-wise over a 27 minute period. The reaction mixture was maintained under reflux for an additional 345 minutes. The catalyst was filtered off, the n-heptane was removed by vacuum distillation, and the small excess of hexadecene-1 was removed at 98° F. and 0.07 mm. Hg.

This solid product was found to contain no silicon-hydrogen bonds; it had a pour point of about 90° F. and a cloud point of about 90° F.

EVALUATION OF PRODUCT (1) *Kinematic viscosity.*—The products from the above examples and other products prepared from the hydrogen silicone polymer and various olefins, treated or untreated, by following the procedure of Example I or Example III, were evaluated for kinematic viscosities by ASTM D445 at various temperatures.

(2) *Thermal stability.*—The products were also evaluated for thermal stability using the following procedure: Twenty grams of a sample of known viscosity are placed in a glass ampule and purged with nitrogen for two minutes. This container is fitted into an aluminum block at 700° F. and held for 90 minutes. During this time, half a pound of nitrogen is passed over the open tip of the ampule. The evaporation loss, the neutralization number and the kinematic viscosity at 100° F. are thereafter measured, using ASTM methods. The percent loss in kinematic viscosity at 100° F. is deemed a measure of the thermal stability of the sample.

(3) *Autogenous ignition test.*—This test measures the ignition temperature of the product. An Erlenmeyer flask is immersed in a lead bath and heated at a constant rate. At every 20° F. rise in temperature, 1 or 2 drops of the sample are introduced into the hot flask, until a temperature is attained where the sample will spontaneously ignite. Once this temperature has been established, the autogeneous ignition temperature (AIT) is found by lowering and raising the temperature until the minimum temperature which will cause 1 to 2 drops of sample to ignite is ascertained.

The above physical properties are considered to be of importance in determining the operational ability of a lubricant of hydraulic fluid at extremes in temperature encountered during use. The following tables list the three evaluations on the products prepared according to the methods of this invention.

TABLE II

| Product | Kinematic viscosity, cs. | | | | Thermal stability | | | AIT, ° F. |
|---|---|---|---|---|---|---|---|---|
| | 400° F. | 210° F. | 100° F. | −40° F. | Percent loss KV at 100° F. | Percent loss (material) | NN | |
| Example I | 2.11 | 7.58 | 34.3 | Wax | 3.2 | 0.47 | 0.41 | |
| Example II | | 5.22 | 19.0 | 960 | | | | 705 |
| Example III | 1.78 | 5.81 | 21.1 | 1,000 | 3.8 | 0.27 | 0.45 | |
| Example IV | | 6.78 | 27.7 | 2,130 | 3.5 | 0.32 | 0.27 | 770 |
| Example VII | 116.0 | 440.0 | 22,500 | | 8.8 | 0.32 | 0.08 | 860 |

TABLE III[1]

| Silicone molecular weight | Alpha-olefin carbon atoms | Kinematic viscosities | | | Thermal stability | | | AIT, ° F. |
|---|---|---|---|---|---|---|---|---|
| | | 210° F. | 100° F. | −40° F. | Percent loss KV at 100° F. | Percent loss (material) | NN | |
| 1,120 | 6 | 16.7 | 60.1 | 2,660 | 1.9 | 0.32 | 0.67 | 840 |
| 1,120 | 8 | 19.8 | 80.4 | 5,370 | 1.3 | 0.48 | 0.55 | 835 |
| 1,120 | 10 | 23.4 | 105.0 | | 3.7 | 0.36 | 0.49 | 835 |
| 2,450 | 6 | 84.2 | 320.0 | 16,400 | 1.1 | 0.46 | 0.0 | 860 |
| 1,032 | 6 | 33.2 | 130.5 | 8,663 | 2.2 | 1.62 | 0.87 | 795 |

[1] The products whose properties are listed in Table III were prepared according to the procedure of Example III without previously distilling the silicone polymer into separate fractions.

The above data show that these products meet the present requirements for many lubricating problems and they may be used as hydraulic fluids in a large number of engine applications.

The products made according to the method of this invention are shown to retain the highly useful thermal stability characteristics of the silicone polymer from which they are derived. Their kinematic viscosities over a wide temperature range make them useful in many applications including certain lubricating operations. They may be dissolved in less expensive hydrocarbons to produce useful blends at a great reduction in cost and in some cases these blends perform as better lubricants than either of the two components alone, as in the case of steel sliding against steel. These products may also be combined with other typical lubricating oil additives with which they are compatible to obtain other important characteristics.

The hereinabove description includes examples and illustrations determined to illustrate various aspects of the disclosed invention and is not intended as a limitation thereof except as claimed in the appended claims.

I claim:
1. A method of preparing an alkylated silicone fluid comprising the steps of:
   (1) percolating an olefinic compound, normally containing impurities which will interfere with alkylation, over activated alumina;
   (2) collecting and maintaining said percolated olefin under a nonoxidizing atmosphere; and
   (3) reacting a stoichiometric excess of said percolated olefin with a silicone polymer containing hydrogen atoms directly bonded to the silicon atoms, in the presence of a catalyst consisting of a member of the platinum group, said reaction resulting in complete removal of silicon-hydrogen bonds from the said silicone polymer.

2. The method of claim 1 wherein the catalyst consists of a metal of the platinum group deposited on an inert carrier.

3. The method of claim 2 wherein the catalyst consists of from about 0.1% to 3.0% by weight of platinum deposited on charcoal.

4. The method of claim 2 wherein the amount of said catalyst is in the range of about 0.4% to 1.0% by weight of total reactants.

5. The method of claim 1 wherein the catalyst is chloroplatinic acid.

6. The method of claim 1 wherein the non-oxidizing atmosphere is selected from the group consisting of nitrogen and the said olefin in a vapor phase.

7. The method of claim 1 wherein the percolated olefin is heated to reflux conditions in the presence of the said catalyst prior to the addition of the silicone polymer.

8. The method of claim 1 wherein the said percolated olefin is reacted with the silicone polymer in at least a 10% stoichiometric excess.

9. The method of claim 1 wherein the silicone polymer has the recurring unit

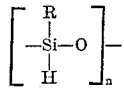

wherein R is selected from the group consisting of hydrogen, alkyl, cycloalkyl, aryl, aralkyl and alkaryl having from 1 to 30 carbon atoms and $n$ is 4 to 40.

10. The method of claim 9 wherein R is methyl.

11. The method of claim 9 wherein the proportion of olefin to silicone polymer is in the range of from about 1.10 to 3.75 moles of olefin per recurring unit of silicone.

12. The method of claim 10 wherein the silicone polymer has a molecular weight in the range of about 400 to 10,000.

13. The method of claim 1 wherein the olefin is selected from the group consisting of hexene-1, heptene-1, octene-1, decene-1 and hexadecene-1.

References Cited

UNITED STATES PATENTS

| 51,558 | 12/1865 | Chesebrough | 208—297 |
| 962,841 | 6/1910 | Hood et al. | 208—297 |
| 2,170,628 | 8/1939 | Breth | 196—147 XR |
| 2,446,799 | 8/1948 | Winding | 196—147 XR |
| 2,596,942 | 5/1952 | Robertson et al. | 196—147 XR |
| 2,823,218 | 2/1958 | Speier et al. | 260—448.2 |
| 2,970,150 | 1/1961 | Bailey | 260—348 XR |
| 3,306,945 | 2/1967 | Conviser | 260—67.7 |

TOBIAS E. LEVOW, *Primary Examiner.*

J. P. PODGORSKI, *Assistant Examiner.*

U.S. Cl. X.R.

260—46.5